UNITED STATES PATENT OFFICE.

CARLETON ELLIS, OF MONTCLAIR, NEW JERSEY.

PROCESS OF MAKING HYDROGENATED RESIN.

1,249,050. Specification of Letters Patent. Patented Dec. 4, 1917.

No Drawing. Original application filed February 7, 1912, Serial No. 675,920. Divided and this application filed February 2, 1916. Serial No. 75,768.

*To all whom it may concern:*

Be it known that I, CARLETON ELLIS, a citizen of the United States, and a resident of Montclair, in the county of Essex and State of New Jersey, have invented certain new and useful Improvements in Processes of Making Hydrogenated Resin, of which the following is a specification.

This invention relates to the hydrogenation of various resins such as damar, sandarac, mastic, shellac, elemi, thus, copal, pontianak and especially rosin to overcome tackiness and increase the hardness or otherwise improve the quality thereof and relates especially to a catalytic method of adding hydrogen involving the use of such catalysts as nickel, copper, cobalt, palladium, platinum and the like in the metallic state or in the form of oxids or in a colloidal condition, etc., all as more fully hereinafter described.

This application contains matter derived from Serial No. 675,920 filed Feb. 7, 1912, now Patent 1,086,357 of Feb. 10, 1914, such matter having been continued in my co-pending application Serial No. 686,988 filed March 29, 1912, of which the present case is a division, and which has now matured into U. S. Patent 1,217,118.

In order to hydrogenate the rosin (or abietic acid) or other resin it may be melted and treated at the temperature preferred for hydrogenation. The rosin or other resin may be dissolved in an inert solvent such as light or heavy benzene or any other suitable solvent. For treating rosin a hydrocarbon solution such as texene may be used to advantage. As most of the resins with the exception of Pontianak resin and the like are highly acid bodies the maintenance of a temperature during hydrogenation at which the combinations of rosin and the like with nickel or other catalyst, are unstable, is most desirable. For some varieties of rosin this temperature is about 180° C. and maintenance above this temperature precludes extensive solution of the catalytic body. The treatment of the rosin and catalyzer with hydrogen may be accomplished in various ways, one of which is to reduce the rosin to a fluid condition by heating it and passing the liquid material in the presence of hydrogen through a catalyzer, as for example, in the manner described in Patent 1,026,156 of May 14, 1912.

By proceeding in this manner it is possible to regulate the heating to suit the different stages of reaction. The absorption of hydrogen appears to be progressive as regards its union in a compound containing for example two double bonds. The first bond being satisfied under conditions of heating best suited therefor, the second bond is then treated under conditions specific therefor as regards the absorption of hydrogen.

The contact of the rosin and catalyzer with hydrogen may be carried out also by spraying or agitation and the like.

In carrying out the process in any of these directions I take ordinary rosin for example, melt it by heating and subject it to the action of hydrogen at a temperature of about 180° C., in the presence of a catalyst such as metallic nickel or palladium which if desired may be on a mineral carrier. Preferably the hydrogen is applied at about ten pounds pressure, although greater or less pressures may be used if desired.

The use of a metallic catalyzer in the presence of an acid body may cause the formation of a metallic soap which is usually undesirable and to avoid this I may heat the material at the time of hydrogenation to a temperature at which the soap cannot exist as such, or if formed, immediately decomposes so that the catalyzer does not enter into solution to an undesired extent. By holding at a temperature about 10° above the decomposition point the formation of metallic soap or metallo-organic bodies largely is prevented.

The temperature varies with the particular organic bodies under treatment and preferably is determined by forming in any suitable manner the metallo-organic compound and then gradually heating until the decomposition point is reached. This temperature may thus establish the conditions governing the procedure with respect to the material in hand.

The hydrogen employed preferably is to be pure and particularly should be free from arsenic and similar bodies which have poisoning action on the particular catalyzer employed.

What I claim is:—

1. The process of reducing the tackiness of rosin which comprises treating with hydrogen under about 10 pounds pressure in the presence of a nickel catalyst.

2. The process of reducing the tackiness of rosin which comprises treating same with hydrogen, free from arsenic, at about 10 pounds pressure, in the presence of a nickel catalyst.

3. The process of reducing the tackiness of rosin which comprises treating same with hydrogen, free from arsenic, at about 10 pounds pressure and at a temperature above that of decomposition of nickel abietate, in the presence of a nickel catalyst.

4. The process of reducing the tackiness of rosin which comprises treating same with hydrogen, free from arsenic, at about 10 pounds pressure and at a temperature above the temperature of decomposition of nickel abietate; the treatment of said rosin being conducted in a hydrocarbon solvent inert to the action of hydrogen.

CARLETON ELLIS.